No. 708,324. Patented Sept. 2, 1902.
F. B. DUNCAN.
LUBRICATING DEVICE.
(Application filed Jan. 19, 1901.)
(No Model.)
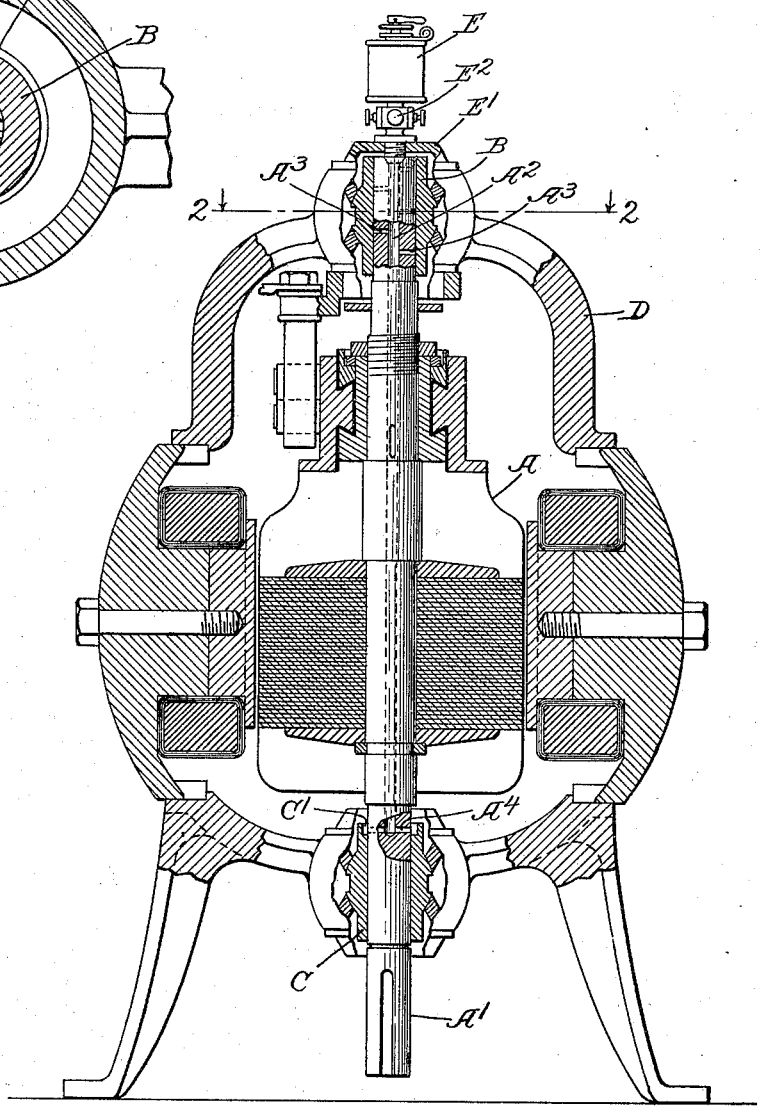

UNITED STATES PATENT OFFICE.

FREDERICK B. DUNCAN, OF MADISON, WISCONSIN, ASSIGNOR TO NORTHERN ELECTRICAL MANUFACTURING COMPANY, OF MADISON, WISCONSIN, A CORPORATION OF WISCONSIN.

LUBRICATING DEVICE.

SPECIFICATION forming part of Letters Patent No. 708,324, dated September 2, 1902.

Application filed January 19, 1901. Serial No. 43,849. (No model.)

*To all whom it may concern:*

Be it known that I, FREDERICK B. DUNCAN, a subject of the Queen of Great Britain, residing at Madison, in the county of Dane and State of Wisconsin, have invented a certain new and useful Improvement in Lubricating Devices, of which the following is a specification.

My invention relates to electric motors with vertical armature-shafts, and has for its object to provide a new and improved construction for oiling the bearings of such vertical armature-shafts.

My invention is illustrated in the accompanying drawings, wherein—

Figure 1 is a sectional view of an electric motor embodying my invention. Fig. 2 is a section on line 2 2, Fig. 1.

Like letters refer to like parts throughout the several figures.

When an electric motor is adapted to be operated with its armature-shaft in a vertical position, a number of disadvantageous conditions are present not presented with the ordinary motor having a horizontal armature-shaft. One of these disadvantageous conditions relates to the proper oiling of the bearings. When the armature-shaft is in a vertical position, the upper bearing runs comparatively free, while the lower bearing is subjected to excessive friction. Very little oil, therefore, is needed for the upper bearing, while the lower bearing needs a large amount. In oiling the upper bearing great care must be taken to supply just enough oil, as if more oil than is necessary is supplied it runs down on the commutator of the motor and injuriously affects its operation.

One of the objects of my invention is to provide means for oiling both bearings in a proper manner, preferably from a single source of supply, the oil for the lower bearing being presented to said bearing clean and fresh without having come into contact with the upper bearing.

In Fig. 1 I have shown one form of electric motor with a vertical armature-shaft embodying my invention. In this construction the armature A is mounted upon the shaft A', said shaft being rotatably mounted in the bearings B and C, preferably connected with the frame D of the machine. The shaft A' is provided with a hole or passage-way $A^2$, running from the upper end toward the lower end, said passage-way preferably ending at or near the lower bearing. The part of the shaft A' inclosed within the upper bearing B is preferably provided with a series of lateral openings or passage-ways $A^3$, which extend from the passage-way $A^2$ to the outer or bearing face of the shaft. These laterally-extending openings or passage-ways may be provided at intervals along the length of the shaft, and a suitable number of them may be used, it only being necessary to have the proper number to provide sufficient oil for the shaft. The proper number of holes can be ascertained in any given case and will be made before the motor is sent out of the shop.

At the bottom of the passage-way $A^2$, I provide one or more lateral openings or passage-ways $A^4$, which extend from the passage-way $A^2$ to the bearing-face of the shaft. This passage-way may be located in any desired position; but I prefer to locate it near the upper end of the lower bearing and provide the lower bearing with a hollow or cup-shaped portion C', into which the oil from the passage-way is received and is then carried down along the bearing-faces. It is of course evident that the passage-ways $A^4$ need not be at the bottom of the passage-way $A^2$; but I prefer to locate them in this position, so that all the oil passing through the shaft will be used in the lower bearing.

Some suitable means is provided for inserting oil in the passage-way $A^2$. Any device for this purpose may be used and, as herein shown, I have illustrated the oil-cup E, fastened to a piece E', extending across the upper bearing. This oil-cup is provided with a suitable controlling device, which controls the flow therefrom and is located so that the oil which flows from it drops into the passage-way $A^2$. I prefer to arrange this oil-cup so that the speed of the flow of the oil can be readily seen. This may be done by making a portion of the discharge-tube transparent, as shown, for example, at $E^2$. When the oil drops from the oil-cup into the passage-way $A^2$ while the shaft is rotating, a portion of the oil will be forced through the lateral passage-ways $A^3$, so as to oil the upper bearing. The amount of oil necessary, of course, will depend upon the speed of the shaft, and this construction automatically controls the feed of the oil, for when the shaft is rotating slowly the centrifugal force only causes a small amount of oil to pass through the lateral passage-ways, while when the shaft is rotating rapidly a greater amount will pass therethrough. The remaining oil is carried down the passage-way by the force of gravity free from dirt, grit, or the like, and when it reaches the bottom passes out through the lateral passage-way $A^4$ into the cup $C'$ and then along the shaft, so as to oil the bearing-face thereof.

I have illustrated a particular construction embodying my invention; but it is of course evident that this construction may be changed in various ways, and I therefore do not limit myself to the particular construction shown.

It will be seen that I have here a device for oiling the bearings of a vertical shaft when said bearings are separated by an intervening space, all of the bearings being oiled from the same cup or source of supply and the oil from each bearing coming directly to the bearing without contact with the bearing above it.

I claim—

1. The combination with suitable bearings of a rotating vertical shaft, having a passage-way extending part way therethrough, one or more lateral passage-ways extending from said passage-way to the upper bearing-face of the shaft, an escape at or near the bottom of said passage-way, by means of which the oil is conducted to the lower bearing-face of the shaft, the parts arranged so that the upper and lower bearings are both oiled from the same passage-way, the oil being supplied to the lower bearing without first making contact with the upper bearing, and means for inserting oil at the upper end of said passage-way.

2. A lubricating device for an electric motor, comprising a vertical armature-shaft rotatably mounted in an upper and a lower bearing, a longitudinal passage-way extending through said shaft from its upper end to a point in proximity to the lower bearing, one or more lateral passage-ways at the upper end of the shaft connecting said longitudinal passage-way with the upper bearing-face of the shaft, an exit at the lower part of said passage-way by means of which the oil can pass to the lower bearing-face of the shaft, a stationary oil-cup mounted at the upper end of the shaft and in position to permit oil to pass into the longitudinal passage-way, whereby the amount of oil supplied to the upper bearing is automatically regulated and the oil for the lower bearing is supplied without making contact with the upper bearing.

FREDERICK B. DUNCAN.

Witnesses:
ALBERT B. DEAN,
AUG. J. BUENZLI.